(12) United States Patent
Cooper

(10) Patent No.: US 8,600,891 B2
(45) Date of Patent: Dec. 3, 2013

(54) SYSTEMS, APPROACHES AND METHODS INVOLVING DEFERRING DEBIT PAYMENT FOR DEBIT-CARD TRANSACTIONS

(75) Inventor: William A. Cooper, Wayzata, MN (US)

(73) Assignee: TCF Financial Corporation, Minneapolis, MN (US)

( * ) Notice: Subject to any disclaimer, the term of this patent is extended or adjusted under 35 U.S.C. 154(b) by 615 days.

(21) Appl. No.: 12/537,979

(22) Filed: Aug. 7, 2009

(65) Prior Publication Data

US 2010/0005016 A1 Jan. 7, 2010

Related U.S. Application Data

(63) Continuation of application No. 12/140,346, filed on Jun. 17, 2008, now Pat. No. 7,594,606, which is a continuation of application No. 11/019,651, filed on Dec. 21, 2004, now Pat. No. 7,398,919, which is a continuation-in-part of application No. 09/614,270, filed on Jul. 12, 2000, now abandoned.

(51) Int. Cl.
  *G06Q 20/40* (2012.01)
  *G06Q 20/10* (2012.01)

(52) U.S. Cl.
  CPC ............... *G06Q 20/40* (2013.01); *G06Q 20/10* (2013.01)
  USPC ............................................. 705/44; 705/35

(58) Field of Classification Search
  USPC ............................................. 705/34, 35, 44
  See application file for complete search history.

(56) References Cited

U.S. PATENT DOCUMENTS

| | | | |
|---|---|---|---|
| 4,346,442 A | 8/1982 | Musmanno | |
| 4,376,978 A | 3/1983 | Musmanno | |
| 4,597,046 A | 6/1986 | Musmanno et al. | |
| 4,774,663 A | 9/1988 | Musmanno et al. | |
| 5,025,138 A | 6/1991 | Cuervo | |
| 5,243,174 A | 9/1993 | Veeneman et al. | |
| 5,500,514 A | 3/1996 | Veeneman et al. | |
| 5,652,421 A | 7/1997 | Veeneman et al. | |
| 5,696,824 A | 12/1997 | Walsh | |
| 5,765,144 A | 6/1998 | Larche et al. | |
| 5,826,243 A | 10/1998 | Musmanno et al. | |
| 5,933,817 A | 8/1999 | Hucal | |
| 5,940,809 A | 8/1999 | Musmanno et al. | |
| 5,945,653 A | 8/1999 | Walker et al. | |
| 5,949,044 A | 9/1999 | Walker et al. | |
| 5,950,179 A | 9/1999 | Buchanan et al. | |
| 5,978,779 A | 11/1999 | Stein et al. | |
| 6,032,136 A | 2/2000 | Brake, Jr. et al. | |

(Continued)

FOREIGN PATENT DOCUMENTS

WO    WO 9629668    9/1996

*Primary Examiner* — James Trammell
*Assistant Examiner* — Daniel L Greene
(74) *Attorney, Agent, or Firm* — Crawford Maunu PLLC

(57) ABSTRACT

A system and method for managing a financial institution account with a transaction card used as a deferred-debit transaction card and as an automated banking card wherein debit transactions are stored by a managing computer system for a billing cycle without being automatically debited against the account until after debit transaction activity. The card user can earn credit, or interest based on deferred debits. Also, in certain instances, a limited time period is provided relative to the billing cycle, for the user to provide funds as consideration for payment against the transaction card purchases without an automatic debiting of available funds as full consideration for payment against the deferred-debit purchases.

63 Claims, 5 Drawing Sheets

(56) References Cited

U.S. PATENT DOCUMENTS

| | | | |
|---|---|---|---|
| 6,038,552 A | 3/2000 | Fleischl | |
| 6,078,907 A | 6/2000 | Lamm | |
| 6,105,865 A * | 8/2000 | Hardesty | 235/380 |
| 6,108,641 A | 8/2000 | Kenna et al. | |
| 6,169,483 B1 | 1/2001 | Ghaffari et al. | |
| 6,182,894 B1 | 2/2001 | Hackett et al. | |
| 6,222,914 B1 | 4/2001 | McMullin | |
| 6,226,624 B1 | 5/2001 | Watson et al. | |
| 6,267,292 B1 | 7/2001 | Walker et al. | |
| 6,324,523 B1 | 11/2001 | Killeen, Jr. et al. | |
| 6,330,544 B1 | 12/2001 | Walker et al. | |
| 6,336,104 B1 | 1/2002 | Walker et al. | |
| 6,343,279 B1 | 1/2002 | Bissonette et al. | |
| 6,353,811 B1 | 3/2002 | Weissman | |
| 6,386,444 B1 | 5/2002 | Sullivan | |
| 6,394,341 B1 | 5/2002 | Mäkipää et al. | |
| 6,446,049 B1 | 9/2002 | Janning et al. | |
| 6,473,500 B1 | 10/2002 | Risafi et al. | |
| 6,609,654 B1 | 8/2003 | Anderson et al. | |
| 6,639,977 B1 | 10/2003 | Swope et al. | |
| 6,685,088 B1 | 2/2004 | Royer et al. | |
| 7,398,919 B2 | 7/2008 | Cooper | |
| 7,594,606 B2 | 9/2009 | Cooper | |
| 2005/0044039 A1 | 2/2005 | Greer et al. | |
| 2009/0024496 A1 * | 1/2009 | Balachandran et al. | 705/34 |

* cited by examiner

SYSTEMS, APPROACHES AND METHODS INVOLVING DEFERRING DEBIT PAYMENT FOR DEBIT-CARD TRANSACTIONS

RELATED PATENT DOCUMENTS

This patent document is a continuation of U.S. patent application Ser. No. 12/140,346 filed on Jun. 17, 2008, entitled "Transaction Card System and Approach," now U.S. Pat. No. 7,594,606, which is a continuation of U.S. patent application Ser. No. 11/019,651 filed on Dec. 21, 2004, and now U.S. Pat. No. 7,398,919; which is a continuation-in-part of U.S. patent application Ser. No. 09/614,270 filed on Jul. 12, 2000, entitled "Debit Card Billing System" and now abandoned; each of these patent documents is fully incorporated herein by reference and for subject matter common thereto, priority is claimed to the earliest of these patent documents under 35 U.S.C. §120.

FIELD OF THE INVENTION

The present invention relates to a system and approach for debit-card transaction purchases with deferred billing.

BACKGROUND OF THE INVENTION

Modern consumers have become accustomed to the safety and convenience of making purchase transactions at remote points of sale using credit cards instead of cash. Credit cards allow a consumer to make purchases on credit accounts in which a credit card issuing institution records purchases to a consumer's account and then sends a monthly billing statement to the consumer. If the consumer elects not to pay off the entire balance of the account at the end of the billing cycle, then the credit card issuing institution typically collects interest on the outstanding balance on the account.

In response to the success of credit cards, banking institutions such as banks and credit unions have developed debit cards which can be used just like credit cards to make purchases. However, unlike credit cards, the purchases are immediately posted to the consumer's checking account as if the consumer had written a check. Therefore, the consumer is not required to pay a monthly statement because the funds to cover the purchase are taken immediately and directly from the consumer's checking account.

Debit card accounts have drawbacks when compared to normal credit card accounts. There may be more than one cardholder drawing on an account such as in a joint checking account. With present debit account systems, using two debit cards for one account can result in overdrafts when both users unknowingly make debit transactions during the same time period. Because both cards draw upon the same account just like checks, two users may inadvertently draw upon the same funds resulting in an overdraft.

In addition, the typical debit account user loses interest compared to a credit card user. Because debit card transactions are posted to the checking account in the same way as checks, a user can expect the checking account to be drawn upon within a few days of the debit transaction. Credit card accounts, on the other hand, allow the user to keep funds in an interest bearing account until the end of a billing cycle before they are needed to pay the credit card bill. By waiting until the end of the month to pay a credit card bill, the credit card user receives interest on the funds for the remaining period of the billing cycle. Current debit card systems employed by banks, however, immediately debit the checking account just like a check would be debited. Therefore, a current debit card user does not receive the added interest he might have gained by keeping the funds in the interest bearing account for the remainder of a billing period.

SUMMARY OF THE INVENTION

The present invention is directed to overcoming the above-mentioned challenges and others, including those related to the types of applications discussed above. These and other aspects of the present invention are exemplified in a number of illustrated implementations and applications, some of which are shown in the figures and characterized in the claims that follow.

An example embodiment of the present invention is directed to a method and system for managing an account for use by a banking institution which provides checking or savings account services. An account user is provided with a debit card which can be used to make debit transactions, each transaction being recorded by the bank but not billed to the account until after a billing cycle elapses and after the account user has been issued a billing cycle statement showing all credit transactions. The system automatically debits the account for all debit transactions made during the billing cycle after a payment period elapses following issuance of the statement.

The system has a number of embodiments and applications suitable for use in various billing systems. First, the system combines into one card the ability to make automated banking transactions on an account with the ability to make debit purchases against the account. The present system actually defers the time of payment as a credit card account would, but combines this ability with the convenience of a banking card tied to a particular financial account.

Various embodiments also address a problem associated with joint accounts. All debit transactions made with the transaction cards issued on the financial account are stored in the system until the end of a billing cycle without being debited against the account. At the end of the billing cycle, all the debit transactions for the billing cycle are reported to the debit card account holders. The debit card account holders are able to review the debit transactions and have the opportunity to supply additional funds or alternative sources of payment other than a direct debit to the account. In this way, joint checking account holders can avoid inadvertent overdrafts.

In addition, through the present system, the debit card account holder receives the advantage of accruing interest on funds which remain in the account during the time that elapses between the debit transaction and the actual debiting of the account for the transaction. Because the system defers debiting the account for the debit transactions until after the billing cycle and after a payment period following the billing cycle, the debit card account holder is able to capture the interest earned on funds which remain in the account during the deferred period.

The above summary is not intended to describe each illustrated embodiment or every implementation of the present invention. The figures, detailed description and claims that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
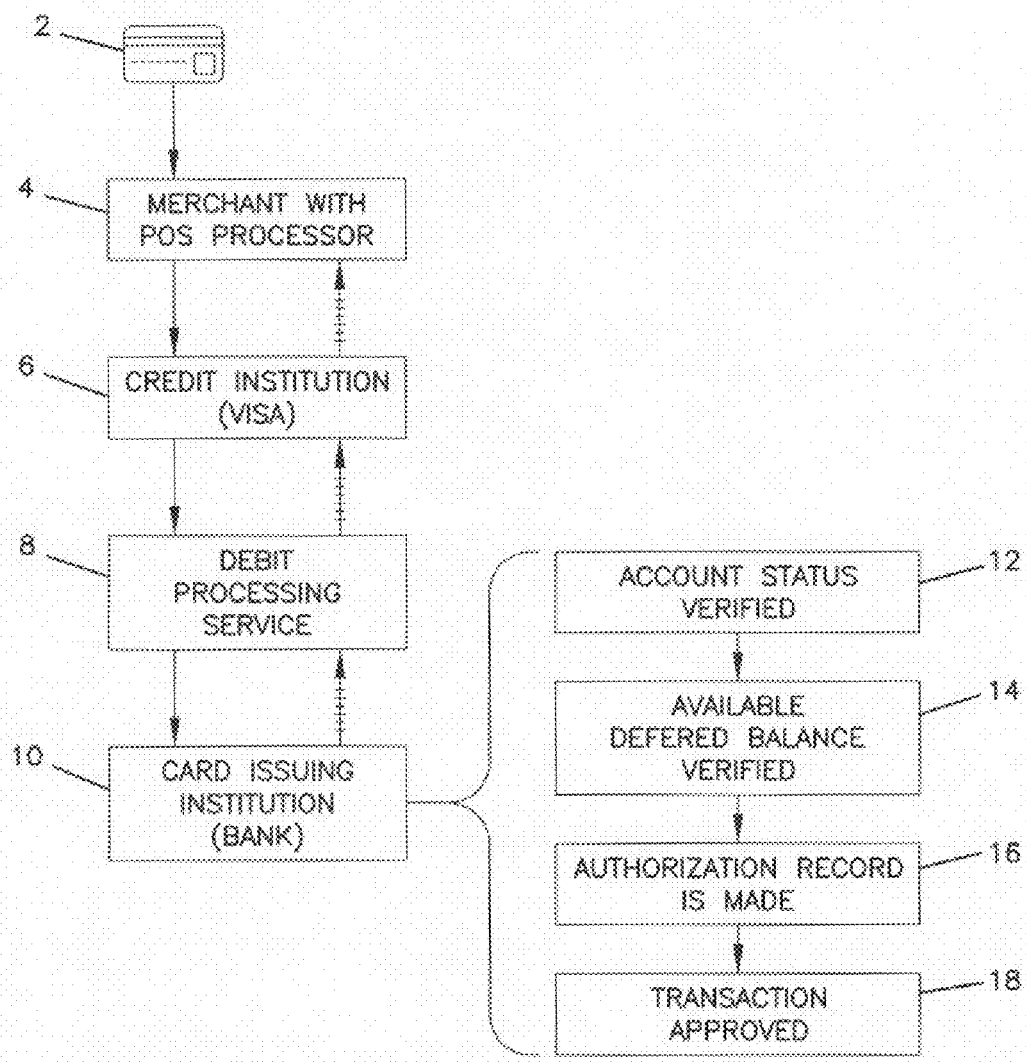
FIG. 1 is a schematic flow chart of a debit transaction authorization process in accordance with an example an embodiment of the present invention.

While the invention is amenable to various modifications and alternative forms, specifics thereof have been shown by way of example in the drawings and will be described in detail. It should be understood, however, that the intention is not to limit the invention to the particular embodiments described.

DETAILED DESCRIPTION

The present invention is believed to be applicable to a variety of different types of devices, processes and approaches, and has been found to be particularly suited for financial transactions involving a consideration-bearing banking account.

According to an example embodiment, a system for managing a financial institution account, such as a checking or savings account, combines the monthly billing schedule of a credit card account with the automatic debiting of a debit account to provide an account holder with greater flexibility and control over cash management. The system includes a transaction card which the account holder can use to make automated banking transactions as well as debit transactions. Greater flexibility as well as convenience is afforded the debit card account holder by the system in that debit transaction information is accumulated and stored for a billing cycle period without being posted against the funds in the account. At the end of the billing cycle a report or statement of debit transactions is produced for the debit card account holder's review. After a predetermined payment period elapses after producing the statement the account is automatically debited for all debit transactions of the billing cycle.

Figure 2:
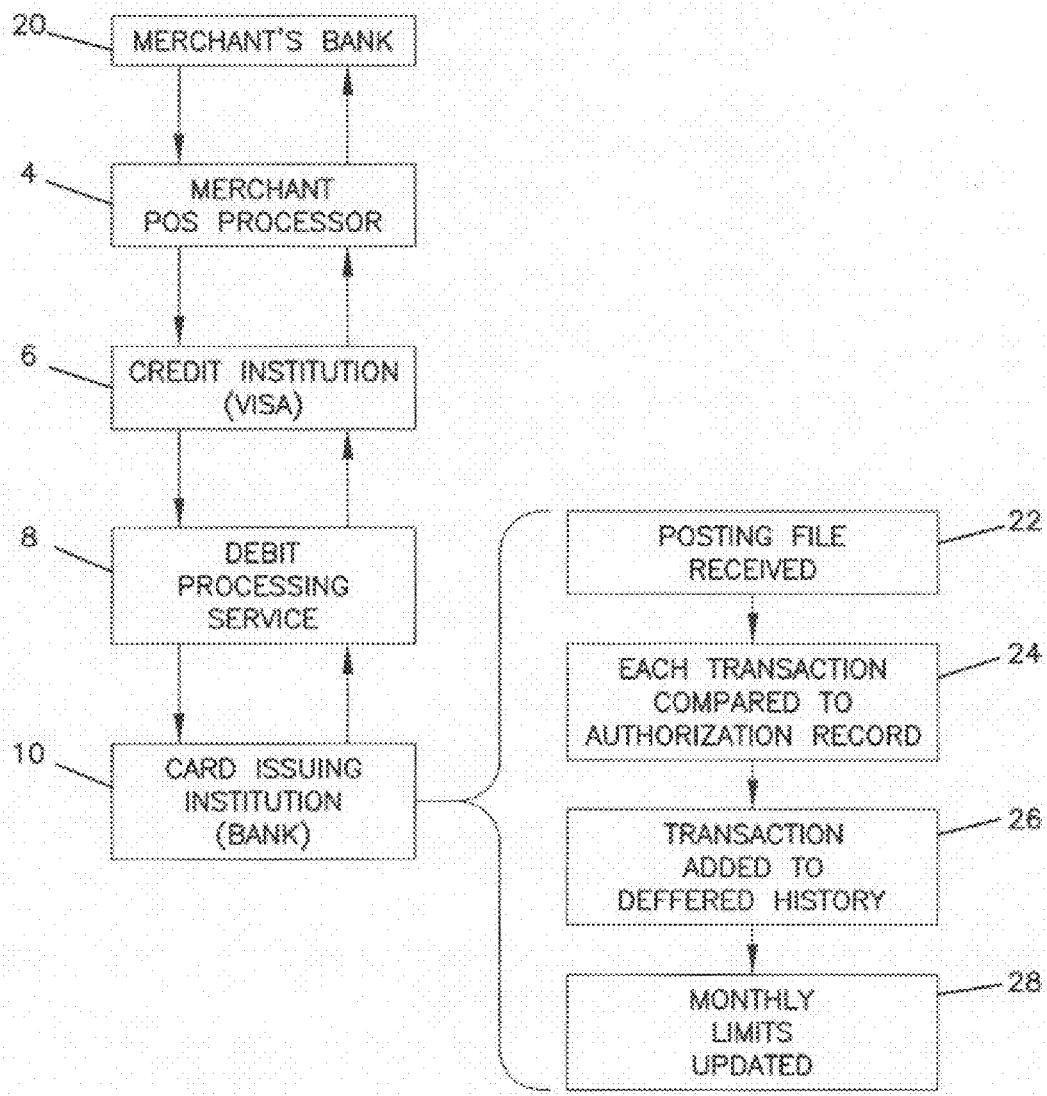
FIG. 2 is a schematic flow chart of a debit transaction settlement process in accordance with another example embodiment of the present invention.

FIGS. 1 and 2 show a debit transaction authorization process and a debit transaction settlement process respectively. In a typical debit transaction, there are a number of parties involved. The transaction involves a consumer or debit card account holder with a debit card 2, a merchant with a point of sale processor 4, a debit card issuing financial institution 10 which issued the debit card for use with the consumer's account, a credit institution 6 such as VISA or MASTERCARD, and often an intermediary clearinghouse or debit processing service 8. The debit card issuing financial institution 10 may be any bank, credit union or similar institution at which the consumer or account holder has opened a checking, savings, or other financial account.

A debit transaction occurs in two phases or steps. Typically, the first phase is an authorization phase. The authorization process is shown in FIG. 1. In the authorization phase the merchant 4 obtains verification and authorization from the debit card issuing financial institution 10 that the debit card 2 is valid and that the user has not exhausted a deferred purchase periodic limit. The authorization phase occurs before the merchant 4 allows the consumer to make the purchase.

The second phase is typically a settlement phase. The settlement phase is shown in FIG. 2. In the settlement phase funds are eventually transferred from the consumer's account at the financial institution to the merchant.

In the authorization phase of the present system, the debit card user first presents a debit card 2 to the merchant 4 in order to make a purchase. The merchant swipes the card through a point of sale processor which reads account information encoded on card 2 and combines it with information such as the date and the amount of the purchase and merchant identification. The point of sale system transmits the debit transaction information to the credit institution 6 identified by the card 2 such as VISA.

Figure 4:
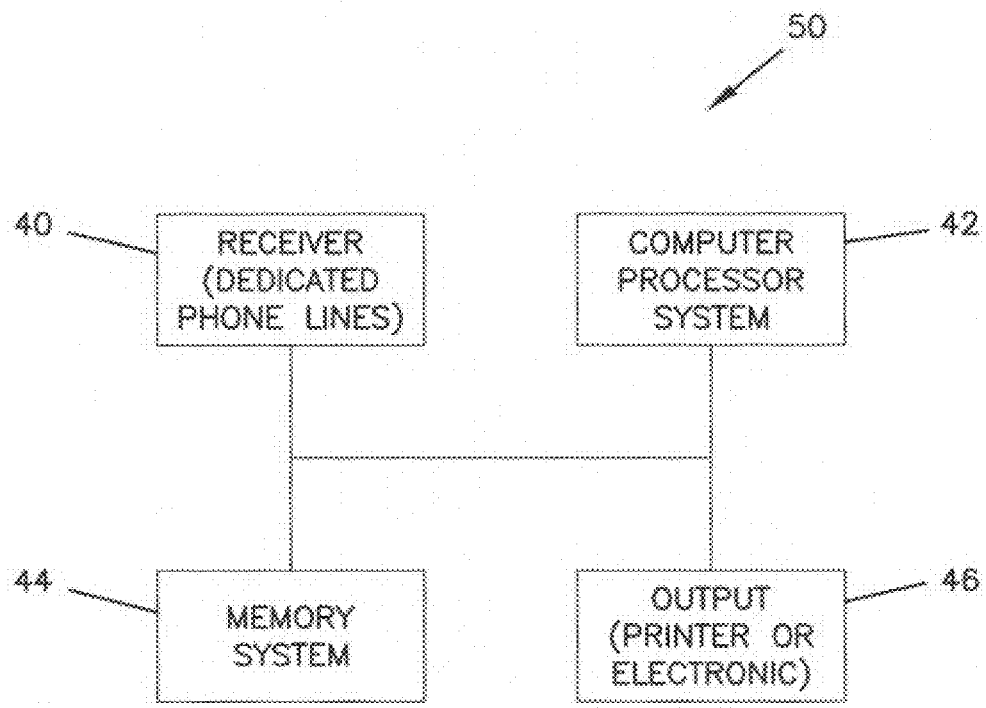
FIG. 4 is a schematic diagram of the components of a computer system, according to another example of the present invention.

The credit institution 6 then identifies the card issuing financial institution 10 and transmits the debit transaction information to the card issuing financial institution 10 either directly or through a debit processing service 8. The information is received by the card issuing financial institution 10 by a managing computer system 50 as shown in FIG. 4. The information may be received by the computer system via a receiver system 40 which typically employs high speed dedicated communication lines. After identifying an account corresponding to the debit card 2 being used, the managing computer system 50 runs verifications against the identified account to determine whether the debit transaction should be authorized. The account status is verified 12 as a valid, open account that has not been put on hold. The amount of the purchase is checked against a deferred debit purchase monthly spending limit 14. The deferred debit purchase spending limit is the amount in debit purchases the debit card account holder is permitted to make each month and may be, for example, between $1,000 and $20,000.

Upon approval by the card issuing financial institution 10, an authorization record is stored 16 in the managing computer system's memory system 44, noting the debit transaction information. An authorization signal is then sent back from the card issuing financial institution 10 through the credit institution 6 to the merchant's point of sale processor 4 where the debit transaction is authorized.

The settlement phase begins when the merchant 4 or the merchant's bank 20 requests payment from the credit institution 6 to cover the debit transactions authorized by the card issuing financial institution 10. Typically, at the end of a business day a merchant 4 will total the debit transactions performed and request payment from the credit institution 6. The credit institution 6 pays the merchant 4 and demands payment from the card issuing financial institution 10 by issuing a schedule or posting file 22 of all the transactions authorized by the card issuing financial institution 10. When the card issuing financial institution 10 receives the posting file, the financial institution's managing computer system 50 verifies each debit transaction listed against the authorization records stored when the authorization was given 24. Upon verification, the card issuing institution 10 makes payment to the credit institution 6. Shortly thereafter, in prior art systems, and typically through on-line or batch processing, the managing computer system debits the consumer's checking account for the amount of the transaction and eliminates the authorization record, thereby completing the debit transaction.

The card issuing financial institution's managing computer system 50 is configured so that, during the settlement phase, after the receipt of the posting file 22, and after the card issuing financial institution 10 makes payment to the credit institution 6, the managing computer system 50 makes a deferred transaction billing record or history 26 without debiting the amount of the transaction against the consumer's account. The spending limit balance available is then updated 28 to reflect the purchase made.

Figure 3:
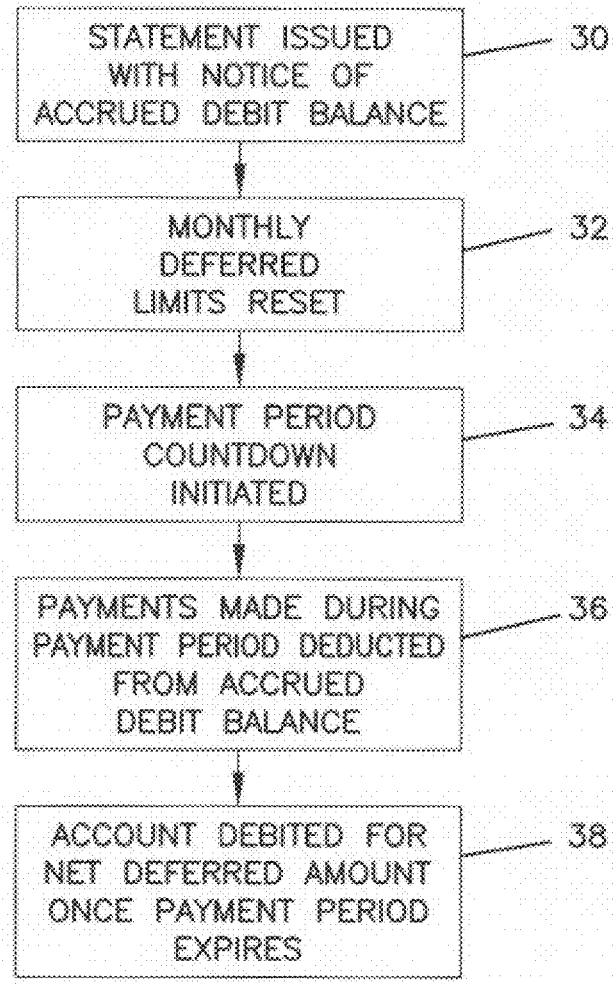
FIG. 3 is a schematic flow chart of the statement and debit process in accordance with another example embodiment of the present invention.

A managing computer system 50 is configured according to an embodiment the present invention, to accumulate a billing record of all debit transactions for a billing cycle, typically one month, without debiting the consumer's account. The debiting of the account is deferred. In this manner a deferred transaction history is maintained for each account. As shown in FIG. 3, at the end of the billing cycle, the managing computer system 50 recalls the billing history and issues a statement which includes a notice itemizing and totaling the deferred debit transaction history for the consumer's account. The statement shows an accrued debit balance for the billing cycle. Once the statement is issued to the debit card account holder 30, the billing cycle spending limit is reset 32, allowing the debit card account holder to make additional deferred purchases for a new billing cycle. The statement may be made either through conventional hard copy reports or through electronic means. For example, the statement may be made available to the consumer by electronically posting the statement information at a secure site such as an internet site accessible by the account holder's personal computer 56, or through an automated telephone service.

Figure 5:
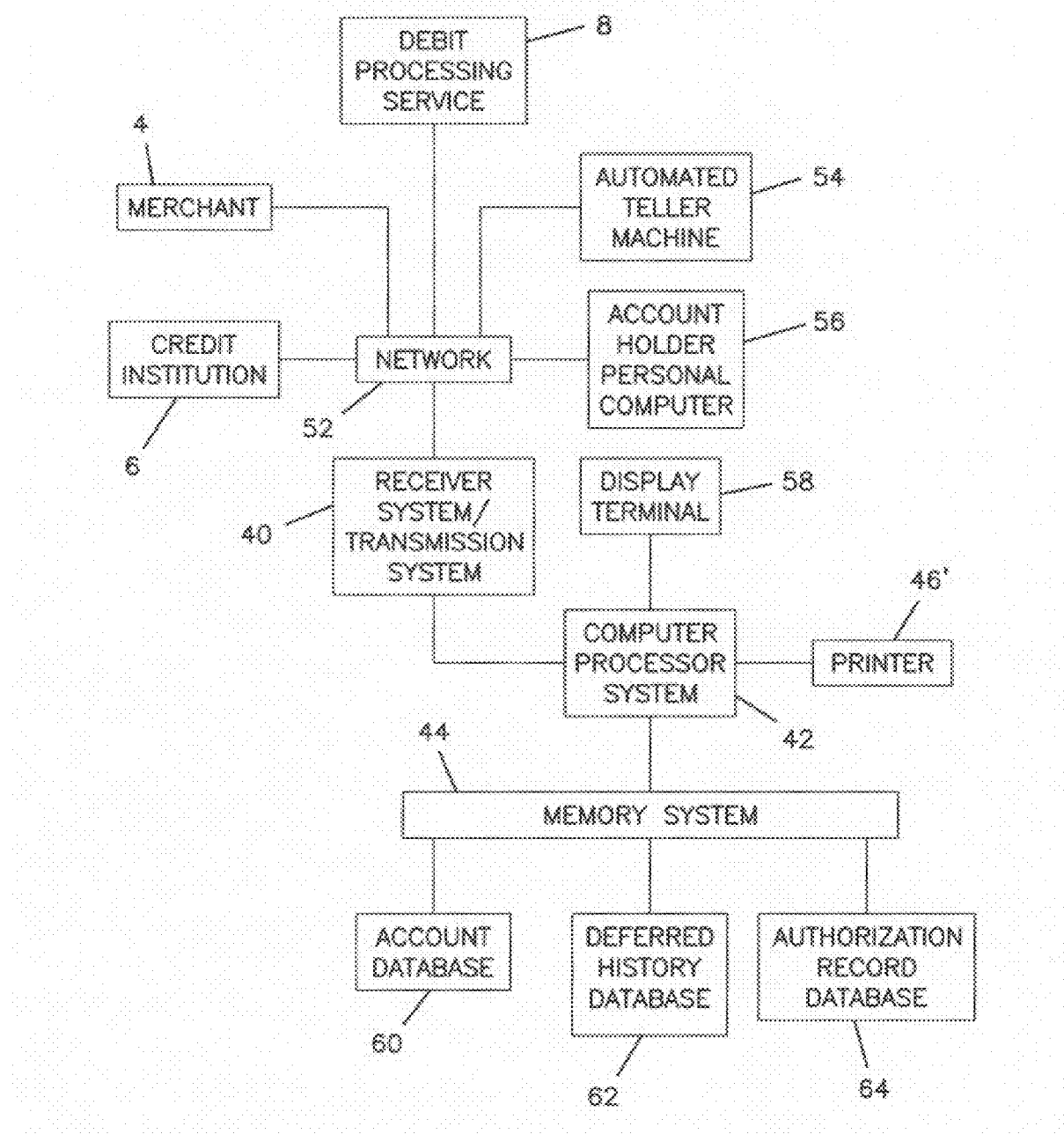
FIG. 5 is a schematic diagram of a networked computer managing system, according to another example of the present invention.

The managing computer system 50 includes a memory system 44. FIG. 5 shows how the memory system 44 may be divided into databases that may include an account database 60, a deferred history database 62, and an authorization record database 64. A record of authorization is made in the authorization record database 64 during the authorization phase as described above. The record may then be recalled from the authorization record database 64 and a new record made in the deferred history database 62 during the settlement phase.

After providing a statement to the debit card account holder, the managing computer system initiates a payment period countdown 34. During the payment period countdown the debit card account holder has the opportunity to designate or provide sources of payment to cover the debit transactions by supplementing the funds of the account itself or by designating another account. The account holder may transfer funds from a credit line or from funds outside the debit card issuing financial institution. The transfer may be accomplished by phone or even electronically. Any payments made during the payment period are deducted from the accrued debit balance 36 which may be recorded in a deferred history database. When the payment period expires, the managing computer system automatically debits the debit card account or another designated account for the accrued debit balance 38. In one preferred embodiment the payment period is a period of fifteen days. The debiting may be accomplished by recalling the deferred debit balance 38 from the deferred history database 62 and debiting an account database 60 as shown in FIG. 5.

The system may also be configured so that the debit cards may be used in automated teller machines 54 to make automated banking transactions such as deposits and withdrawals. The managing computer system 50 according to the present invention may be configured to distinguish automated banking transactions from debit transactions wherein only the debiting of the debit transactions is deferred during the payment period. Accordingly, depending upon system configurations, automated banking transactions either may be posted to the account during on-line or batch processing, or they may be deferred according to the present invention.

By combining debit card purchasing and deferred billing utilizing a single transaction card to accomplish both debit transactions as well as automated banking, a debit card account holder can reduce the number of cards needed to perform all of these functions. Reducing the number of cards is not only more convenient for the debit card account holder but also decreases the risk of having multiple cards lost or stolen.

In summary, the present invention is directed to a deferred billing debit card system and method for managing an account at a financial institution. The system and method can be used in conjunction with a transaction card 2 which is encoded with computer-readable information identifying the financial institution 10 and the account at the financial institution 10. An account holder uses the transaction card 2 to make debit purchases and transactions. The system includes a receiver system 40 which may include high speed dedicated phone or communication lines for receiving electronically transmitted debit transaction information generated by the account holder's use of the transaction card 2 in making a debit transaction. The debit transaction information is stored in a computer-readable memory system 44. A computer processor system 42 recalls the debit transaction information from the memory system 44 and aggregates the debit transaction information in a statement showing an accrued debit balance 30 for a billing cycle. The computer processor system 42 automatically debits the account for the accrued debit balance 38 but not until after the end of the billing cycle and after the account holder is given an opportunity during a payment period 34 to provide a source of payment to cover all or part of the accrued debit balance.

The present invention may be configured to include an output system 46 by which the billing system makes the statement available to the account holder. The output system 46 may include a printer system for generating hard copy statements to be sent by mail to the account holder or the statement may be made available by electronic means via electronic mail or posting on a secure internet site.

The present invention may also be configured to work in conjunction with a transaction card that has also been encoded to be capable of use in automated banking transactions.

The present invention is to be limited only in accordance with the scope of the appended claims, since persons skilled in the art may devise other embodiments still within the limits of the claims. For example, the features described in the present application are not limited to a bank but apply to other financial institutions such as a credit union, a trust company, a savings and loan association, or a savings association. Furthermore, the present systems and methods may be applied to financial institution accounts beyond checking accounts, such as by designating payment of accumulated debit transactions against a savings account.

What is claimed is:

1. A system for managing activity involving transaction cards issued to respective users relative to their status at a financial institution at which they hold a consideration-bearing financial account, the system comprising a computer arrangement including data representing a predetermined deferred debit limit threshold and being configured and arranged, for each user, for:
   storing data representing a balance of funds attributed to the consideration-bearing financial account;
   establishing a purchase limit based on a transaction balance of the consideration-bearing financial account;
   tracking purchases against a transaction card based upon the purchase limit;

verifying that the predetermined deferred debit limit threshold of the consideration-bearing financial account has not been exceeded;

providing a credit for the user based upon purchases against the transaction card; and at the end of a billing cycle:

issuing a statement to the user indicating a balance in the consideration-bearing financial account and transaction card purchases occurring during the billing cycle, relative to the debit limit threshold, providing a time window for the user to provide funds for the transaction card purchases, and automatically transferring funds for the transaction card purchases reflected on the statement as a function of the transaction card purchases and a communication protocol implemented with the user during the time window.

2. The system of claim 1, wherein the consideration-bearing financial account is an investment account and the computer arrangement is configured and arranged, for each user, for, storing the data representing a balance of funds attributed to the consideration-bearing financial account by storing data representing an amount of funds held in the investment account, and establishing the transaction card purchase limit by establishing the limit based upon a transaction balance of the investment account.

3. The system of claim 1, wherein the consideration-bearing financial account is an investment account and the computer arrangement is configured and arranged, for each user, for, storing the data representing a balance of funds attributed to the consideration-bearing financial account by storing data representing an amount of funds held in the investment account, establishing the transaction card purchase limit by establishing the limit based upon the transaction balance of the investment account, and providing the credit by determining an accrued interest amount based upon the balance of funds attributed to the investment account, and increasing the balance of funds based upon the determined accrued interest amount.

4. The system of claim 1, wherein the consideration-bearing financial account is a trust account and the computer arrangement is configured and arranged, for each user, for, storing the data representing a balance of funds attributed to the consideration-bearing financial account by storing data representing an amount of funds held in the trust account, and establishing the transaction card purchase limit by establishing the limit based upon a transaction balance of the trust account.

5. The system of claim 1, wherein the computer arrangement is configured and arranged, for each user, for providing the credit for the user based upon purchases against the transaction card by providing an interest credit for the user based upon interest earned on funds for the purchases against the transaction card which remain in the account.

6. The system of claim 1, wherein the computer arrangement is configured and arranged, for each user, for issuing the statement to each user to notify the user of a balance in the consideration-bearing financial account and transaction card purchases occurring during the billing cycle, thereby informing the user of the balance as relative to the debit limit threshold.

7. The system of claim 1, wherein the computer arrangement is configured and arranged, for each user, for posting the statement to an internet site to notify the user of a balance in the consideration-bearing financial account and transaction card purchases occurring during the billing cycle, thereby informing the user of the balance as relative to the debit limit threshold.

8. The system of claim 1, wherein the computer arrangement is configured and arranged, for each user, for verifying that a predetermined deferred debit limit threshold of the consideration-bearing financial account has not been exceeded by verifying that the purchase limit has not been exceeded.

9. The system of claim 1, wherein the computer arrangement is further configured and arranged, for each user, for tracking withdrawals against the consideration-bearing financial account relative to the transaction card purchase limit, issuing the statement by issuing a statement indicating the withdrawals occurring during the billing cycle, providing the time window by providing a time window for the user to provide funds for the withdrawals, and automatically transferring the funds by automatically transferring funds for the withdrawals reflected on the statement as a function of the withdrawals and a communication protocol implemented with the user during the time window.

10. The system of claim 1, wherein the computer arrangement is configured and arranged, for each user, for automatically transferring the funds for the transaction card purchases by electronically transferring funds from the consideration-bearing financial account to a financial institution that provided payment to cover the purchases.

11. The system of claim 1, wherein the computer arrangement is configured and arranged, for each user, for establishing the transaction card purchase limit by establishing the transaction card purchase limit based on a set credit limit for the user.

12. The system of claim 1, wherein the computer arrangement is further configured and arranged, for each user, for tracking purchases made by at least two users employing separate transaction cards assigned to a single transaction card account.

13. The system of claim 1, wherein the computer arrangement is configured and arranged, for each user, for establishing the purchase limit based on a transaction balance of the consideration-bearing financial account by updating the purchase limit to reflect purchases made during the billing cycle.

14. A method for managing activity involving transaction cards issued to respective users relative to their status at a financial institution at which they hold a consideration-bearing financial account, the method comprising, for each user:

storing, in a database, data representing a predetermined deferred debit limit threshold and data representing a balance of funds attributed to the consideration-bearing financial account;

in a computer circuit, executing programming for establishing a purchase limit based on a transaction balance of the consideration-bearing financial account;

tracking purchases against a transaction card based upon the purchase limit;

verifying that the predetermined deferred debit limit threshold of the consideration-bearing financial account has not been exceeded;

providing a credit for the user based upon purchases against the transaction card; and at the end of a billing cycle:

issuing a statement to the user indicating a balance in the consideration-bearing financial account and transaction card purchases occurring during the billing cycle, relative to the debit limit threshold, providing a time window for the user to provide funds for the transaction card purchases, and automatically transferring funds for the transaction card purchases reflected on the statement as a function of the transaction card purchases and a communication protocol implemented with the user during the time window.

15. The method of claim 14, wherein the consideration-bearing financial account is an investment account, storing data representing a balance of funds attributed to the consideration-bearing financial account includes storing data representing an amount of funds held in an investment account, and executing programming for establishing a transaction card purchase limit includes establishing the limit based upon a transaction balance of the investment account, and providing a credit includes determining an accrued interest amount based upon the balance of funds attributed to the investment account, and increasing the balance of funds based upon the determined accrued interest amount.

16. The method of claim 14, wherein the consideration-bearing financial account is a trust company account, storing data representing a balance of funds attributed to the consideration-bearing financial account includes storing data representing an amount of funds held in a trust account, and executing programming for establishing a transaction card purchase limit includes establishing the limit based upon a transaction balance of the trust account.

17. The method of claim 14, wherein executing programming for providing a credit for the user based upon purchases against the transaction card includes providing an interest credit for the user based upon interest earned on funds for the purchases against the transaction card which remain in the account.

18. The method of claim 14, wherein executing programming for issuing a statement to the user includes notifying the user of a balance in the consideration-bearing financial account and transaction card purchases occurring during the billing cycle, thereby informing the user of the balance as relative to the debit limit threshold.

19. The method of claim 14, wherein executing programming for verifying that a predetermined deferred debit limit threshold of the consideration-bearing financial account has not been exceeded includes verifying that the transaction card purchase limit has not been exceeded.

20. A system for managing activity involving transaction cards issued to respective users relative to their status at a financial institution at which they hold a consideration-bearing financial account, the system comprising:

a computer arrangement configured and arranged, for each user, for:

storing data representing a predetermined deferred debit limit threshold and data representing a balance of funds attributed to the consideration-bearing financial account;

establishing a purchase limit based on a transaction balance of the consideration-bearing financial account;

tracking purchases against a transaction card based upon the purchase limit and monitoring the predetermined deferred debit limit threshold;

providing an interest credit to the user based upon purchases against the transaction card and the balance of funds attributed to the consideration-bearing financial account; and at the end of a billing cycle, automatically transferring funds to cover the transaction card purchases made during the billing cycle.

21. A purchase transaction system for managing transaction cards issued to respective users relative to their status at a financial institution at which the users hold a consideration-bearing financial account that contains deposited user funds, the system comprising:

a computer arrangement configured and arranged, for each user, for:

storing data representing a deposited balance of funds attributed to the consideration-bearing financial account;

deferring debits from the consideration-bearing financial account for purchases against the transaction card;

establishing a purchase limit based on a transaction balance of the consideration-bearing financial account and a threshold amount;

reducing the purchase limit, in response to a change in the transaction balance of the consideration-bearing financial account relative to the threshold amount; and authorizing and tracking purchases against the transaction card as a function of the purchase limit, and of unpaid purchases against the transaction card.

22. The system of claim 21, wherein the consideration-bearing financial account is an investment account, and wherein the computer arrangement is configured and arranged, for each user, for storing the data by storing data representing an amount of funds held in the investment account, establishing the purchase limit by establishing the limit based upon a transaction balance of the investment account, and reducing the purchase limit by reducing the limit based upon the investment account and an amount of deferred debits for a billing cycle.

23. The system of claim 21, wherein the consideration-bearing financial account is an investment account, and wherein the computer arrangement is configured and arranged, for each user, for storing the data by storing data representing an amount of funds held in the investment account, establishing the purchase limit by establishing the limit based upon a transaction balance of the investment account, and reducing the purchase limit by reducing the limit based upon the investment account and an amount of deferred debits for a billing cycle, and determining an accrued interest amount based upon the balance of funds held in the investment account, including an amount of the deferred debit, and increasing the balance of funds in the investment account based upon the determined accrued interest amount.

24. The system of claim 21, wherein the consideration-bearing financial account is a trust account, and wherein the computer arrangement is configured and arranged, for each user, for storing the data by storing data representing an amount of funds held in the trust account, and establishing the purchase limit by establishing the limit based upon a transaction balance of the trust account.

25. The system of claim 21, wherein the consideration-bearing financial account is a trust account, and wherein the computer arrangement is configured and arranged, for each user, for storing the data by storing data representing an amount of funds held in the trust account, and establishing the purchase limit by establishing the limit based upon the amount of funds held in the trust account.

26. The system of claim 21, wherein the computer arrangement is configured and arranged, for each user, for deferring the debits by issuing a payment to cover purchases against the transaction card during a billing cycle, and authorizing and tracking the purchases by storing data to reflect funds attributed to the purchases as deferred debit funds without debiting the funds against the consideration-bearing financial account during the billing cycle.

27. The system of claim 21, wherein the computer arrangement is configured and arranged, for each user, for reducing the purchase limit by reducing the purchase limit in response to the transaction balance dropping below an established balance, prior to making a payment for a purchase against the transaction card.

28. The system of claim 21, wherein the computer arrangement is configured and arranged, for each user, for providing the user with a time period, after an end of a billing cycle, to select a funding option to provide funds to cover the tracked purchases, and after the time period expires, transferring electronic funds, designated by the user, to cover the tracked purchases.

29. The system of claim 21, wherein the computer arrangement is configured and arranged, for each user, for providing the user with a time period, after an end of a billing cycle, to select a funding option to provide funds to cover the tracked purchases, and after the time period expires, and in response to the user not providing funds, transferring electronic funds from the user's consideration-bearing financial account to cover the tracked purchases.

30. The system of claim 21, wherein the computer arrangement is configured and arranged, for each user, for adjusting the purchase limit in response to a change in a balance attributed to the consideration-bearing financial account.

31. The system of claim 21, wherein the computer arrangement is configured and arranged, for each user, for reducing the purchase limit in response to a deposited funds balance of the consideration-bearing financial account dropping below a set amount, relative to purchases made against the transaction card.

32. The system of claim 21, wherein the computer arrangement is configured and arranged, for each user and at the end of a billing cycle, for providing a statement of purchases against the transaction card to the user, and resetting unpaid purchases against the transaction card to zero for the purposes of authorizing purchases against the transaction card.

33. The system of claim 21, wherein the computer arrangement is configured and arranged, for each user, for providing an interest credit for the user based upon interest earned on funds that are designated to purchases against the transaction card and that remain in the account during a billing cycle.

34. A method for managing transaction cards issued to respective users relative to their status at a financial institution at which the users hold a consideration-bearing financial account that contains deposited user funds, the method comprising:

operating a computer circuit, for each user, for:

storing data representing a deposited balance of funds attributed to the consideration-bearing financial account;

deferring debits from the consideration-bearing financial account for purchases against the transaction card;

establishing a purchase limit based on a transaction balance of the consideration-bearing financial account and a threshold amount;

reducing the purchase limit, in response to a change in the transaction balance of the consideration-bearing financial account relative to the threshold amount; and authorizing and tracking purchases against the transaction card as a function of the purchase limit and of unpaid purchases against the transaction card.

35. The method of claim 34, wherein operating a computer circuit for reducing the purchase limit includes reducing the purchase limit in response to the transaction balance dropping below an established balance, prior to making a payment for a purchase against the transaction card.

36. The method of claim 34, wherein operating a computer circuit for deferring the debits includes issuing a payment to cover purchases against the transaction card during a billing cycle, and authorizing and tracking the purchases includes storing data to reflect funds attributed to the purchases as deferred debit funds without debiting the funds against the consideration-bearing financial account during the billing cycle.

37. The method of claim 34, wherein operating a computer circuit for storing the data includes storing data representing an amount of funds held in a trust account, and establishing the purchase limit includes establishing the limit based upon a transaction balance of the trust account.

38. The method of claim 34, wherein operating a computer circuit for storing the data includes storing data representing an amount of funds held in a trust account, and establishing the purchase limit includes establishing the limit based upon the amount of funds held in the trust account.

39. The method of claim 34, wherein operating a computer circuit for storing the data includes storing data representing an amount of funds held in an investment account, establishing the purchase limit includes establishing the limit based upon a transaction balance of the investment account, and reducing the purchase limit includes reducing the limit based upon the investment account and an amount of deferred debits for a billing cycle.

40. The method of claim 34, wherein operating a computer circuit for storing the data includes storing data representing an amount of funds held in an investment account, establishing the purchase limit includes establishing the limit based upon a transaction balance of the investment account, and reducing the purchase limit includes reducing the limit based upon the investment account and an amount of deferred debits for a billing cycle, and further including operating the computer circuit for determining an accrued interest amount based upon the balance of funds held in the investment account, including an amount of the deferred debit, and increasing the balance of funds in the investment account based upon the determined accrued interest amount.

41. A system for managing activity involving transaction cards issued to respective users relative to their status at a financial institution at which they hold a consideration-bearing financial account, the system comprising a computer arrangement including data representing a predetermined deferred debit limit threshold and being configured and arranged, for each user, for:

storing data representing a balance of funds attributed to the consideration-bearing financial account;

establishing a purchase limit based on a transaction balance of the consideration-bearing financial account;

tracking purchases against a transaction card based upon the purchase limit;

monitoring the predetermined deferred debit limit threshold of the consideration-bearing financial account to determine if it has been exceeded;

assessing a periodic fee against the consideration-bearing financial account in response to detecting that predetermined deferred debit limit threshold has been exceeded; and at the end of a billing cycle:

issuing a statement to the user indicating a balance in the consideration-bearing financial account and transaction card purchases occurring during the billing cycle, relative to the debit limit threshold, providing a time window for the user to provide funds for the transaction card purchases, and automatically transferring funds for the transaction card purchases reflected on the statement as a function of the transaction card purchases and a communication protocol implemented with the user during the time window.

42. The system of claim 41, wherein the computer arrangement is further configured and arranged to stop assessment of the periodic fee in response to a user depositing funds into the consideration-bearing financial account to bring financial account below the deferred debit limit threshold.

43. The system of claim 41, wherein the periodic fee varies according to the amount that the deferred debit limit threshold is exceeded.

44. The system of claim 41, wherein the periodic fee includes interest charged against the account.

45. The system of claim 41, wherein the periodic fee does not include a per-transaction fee.

46. The system of claim 41, wherein another account is automatically debited in response to the deferred debit limit threshold being exceeded.

47. The system of claim 41, wherein the transaction balance includes banking transactions other than debit card purchases.

48. The system of claim 47, wherein the banking transactions include deposits and withdrawals.

49. The system of claim 41, wherein the predetermined deferred debit limit threshold represents a negative balance.

50. A computer-based system for managing transactions involving transaction cards issued to respective users relative to their status at a financial institution at which the users hold a consideration-bearing financial account that contains deposited user funds, the system including a computer that is configured and programmed to store data representing a deposited balance of funds attributed to a consideration-bearing financial account held by a user at the financial institution;

defer debits, for purchases made using the transaction card, against the financial account;

establish a purchase limit, for the deferred debits, based on a transaction balance of the financial account and a deferred-debit limit;

reduce the purchase limit, in response to a change in the transaction balance of the financial account relative to the deferred-debit limit;

provide an opportunity for the user to designate one of multiple sources of payment, including the consideration-bearing financial account and another financial account, from which funds may be transferred to increase the balance of funds and cover the deferred debits accrued against the consideration-bearing financial account by purchases made using the transaction card; and track purchases against the transaction card as a function of the purchase limit and of unpaid purchases against the transaction card.

51. The system of claim 50, wherein the computer is further configured and programmed to defer debits wherein the transaction card is not a credit card and wherein the consideration-bearing financial account is a checking account.

52. The system of claim 50, wherein the computer is further configured and programmed to transfer funds, in response to designation by a user, from a designated source of payment to pay for the deferred debits accrued against the consideration-bearing financial account.

53. They system of claim 50, wherein the computer is further configured and programmed to increase the purchase limit by an amount of the transferred funds.

54. A computer-based method for managing transactions involving transaction cards issued to respective users relative to their status at a financial institution at which the users hold a consideration-bearing financial account that contains deposited user funds, the method executed by a computer that performs the steps of storing data representing a deposited balance of funds attributed to a consideration-bearing financial account held by a user at the financial institution;

deferring debits, for purchases made using the transaction card, against the financial account;

establishing a purchase limit, for the deferred debits, based on a transaction balance of the financial account and a deferred-debit limit;

reducing the purchase limit, in response to a change in the transaction balance of the financial account relative to the deferred-debit limit;

providing an opportunity for the user to designate one of multiple sources of payment, including the consideration-bearing financial account and another financial account, from which funds may be transferred to increase the balance of funds and cover the deferred debits accrued against the consideration-bearing financial account by purchases made using the transaction card; and tracking purchases against the transaction card as a function of the purchase limit and of unpaid purchases against the transaction card.

55. The method of claim 54, wherein
the computer performs the steps of, at the end of a billing cycle, resetting the purchase limit to the deferred-debit limit and initiating a payment period, and
the computer performs the step of deferring debits by deferring debits against the account until the end of the initiated payment period, after the purchase limit has been reset, and upon expiration of the payment period, debiting the consideration-bearing financial account to cover the deferred debits.

56. The method of claim 54, wherein the computer performs the steps of
authorizing the purchases;
deferring debits by issuing a payment to cover purchases against the transaction card during a billing cycle, and
tracking purchases by storing data to reflect funds attributed to the purchases as deferred debit funds without debiting the funds against the financial account during the billing cycle.

57. The method of claim 54, wherein the computer performs the steps of
storing data by storing data representing an amount of funds held in a trust account, and
establishing a purchase limit by establishing the limit based a transaction balance of the trust account and the deferred-debit limit 58. The method of claim 54, wherein the computer performs the steps of
storing data by storing data representing an amount of funds held in a trust account, and
establishing a purchase limit by establishing the limit based upon a status of the trust account and the deferred-debit limit.

59. The method of claim 54, wherein the computer performs the steps of
storing the data by storing data representing an amount of funds held in an investment account,
establishing the purchase limit by establishing the limit based upon a transaction balance of the investment account and the deferred-debit limit, and
reducing the purchase limit by reducing the limit based upon a status of the investment account and an amount of deferred debits for a billing cycle.

60. The method of claim 54, wherein the computer performs the steps of
storing the data by storing data representing an amount of funds held in an investment account,
establishing the purchase limit by establishing the limit based upon a transaction balance of the investment account and the deferred-debit limit,
reducing the purchase limit by reducing the limit based upon a status of the investment account and an amount of deferred debits for a billing cycle,
determining an accrued interest amount based upon the balance of funds held in the investment account, including an amount of the deferred debit, and
increasing the balance of funds in the investment account based upon the determined accrued interest amount.

61. The method of claim 54, wherein the consideration-bearing financial account includes investment funds.

62. The method of claim 54, wherein the computer performs the further step of receiving notification of transferred funds from the consideration-bearing financial account.

63. The method of claim 54, wherein the computer performs the further step of receiving notification of funds being transferred, for deposit in the consideration-bearing financial account, from another financial institution.

* * * * *

UNITED STATES PATENT AND TRADEMARK OFFICE
CERTIFICATE OF CORRECTION

PATENT NO.         : 8,600,891 B2                              Page 1 of 1
APPLICATION NO.    : 12/537979
DATED              : December 3, 2013
INVENTOR(S)        : Cooper It is certified that error appears in the above-identified patent and that said Letters Patent is hereby corrected as shown below:

In the Claims

Col. 14, line 40, Claim 53: "They" should read --The--.

Col. 15, line 28, Claim 57: "based a" should read --based on a--.

Signed and Sealed this
Tenth Day of March, 2015

Michelle K. Lee
*Deputy Director of the United States Patent and Trademark Office*